United States Patent
Leistner et al.

(10) Patent No.: US 10,570,256 B2
(45) Date of Patent: Feb. 25, 2020

(54) FLUORESCENT SILOXANE ELASTOMER, METHOD FOR SYNTHESIS OF THE SAME AND THE USE

(71) Applicants: Polymerics GmbH, Berlin (DE); BAM Bundesanstalt fuer Materialforschung und -pruefung, Berlin (DE)

(72) Inventors: Aniela Leistner, Hoppegarten OT Birkenstein (DE); Daniel Siebler, Berlin (DE); André Leistner, Hoppegarten OT Birkenstein (DE); Marina Stier, Berlin (DE)

(73) Assignees: Polymerics GmbH, Berlin (DE); BAM Bundesanstalt fuer Materialforschung und-pruefung, Berlin (DE)

( * ) Notice: Subject to any disclaimer, the term of this patent is extended or adjusted under 35 U.S.C. 154(b) by 0 days.

(21) Appl. No.: 15/551,365

(22) PCT Filed: Mar. 31, 2016

(86) PCT No.: PCT/DE2016/000147
§ 371 (c)(1),
(2) Date: Aug. 16, 2017

(87) PCT Pub. No.: WO2016/155695
PCT Pub. Date: Oct. 6, 2016

(65) Prior Publication Data
US 2018/0030210 A1    Feb. 1, 2018

(30) Foreign Application Priority Data
Apr. 2, 2015   (DE) .................. 10 2015 004 437

(51) Int. Cl.
*C08G 77/38* (2006.01)
*C09B 69/10* (2006.01)
*C09K 11/06* (2006.01)

(52) U.S. Cl.
CPC ............ *C08G 77/38* (2013.01); *C09B 69/109* (2013.01); *C09K 11/06* (2013.01); *C09K 2211/1466* (2013.01); *C09K 2211/1491* (2013.01)

(58) Field of Classification Search
CPC .... C08G 77/398; C08G 77/388; C09B 69/109
See application file for complete search history.

(56) References Cited

U.S. PATENT DOCUMENTS

| | | | |
|---|---|---|---|
| 5,585,915 A | 12/1996 | Kurosawa et al. |
| 7,323,531 B2 | 1/2008 | Toulokhonova et al. |
| 2012/0153229 A1 | 6/2012 | Bae et al. |
| 2015/0153229 A1 | 6/2015 | Badri et al. |

FOREIGN PATENT DOCUMENTS

| EP | 0 455 384 A2 | 11/1991 |
|---|---|---|
| EP | 2 472 688 A2 | 7/2012 |
| FR | 2 900 408 A1 | 11/2007 |
| FR | 2 975 397 A1 | 11/2012 |
| JP | 2013060399 A | 4/2013 |
| WO | 2008/138727 A1 | 11/2008 |
| WO | 2012031128 | * 3/2012 |

OTHER PUBLICATIONS

International Search Report of PCT/DE2016/000147, dated Jul. 14, 2016.
Hecht, M. et al. "Fluorinated Boron-Dipyrromethene (BODIPY) Dyes: Bright and Versatile Probes for Surface Analysis" ChemistryOpen 2013, 2, pp. 25-38.
Kaerkkaeinen, A. et al. "Covalent Bonding of Coumarin Molecules to Sol-gel Matrices for Organic Light Emitting Device Applications." Proceedings of SPIE, vol. 3943, 2000, pp. 194-209.
Rampazzo, Enrico et al. "Pluronic-silica (PluS) Nanoparticles Doped with Multiple Dyes Featuring Complete Energy Transfer." The Journal of Physical Chemistry. C: Nanomaterials and interfaces, vol. 118, 2014, No. 17, pp. 9261-9267.
Document "Silylated BODIPY dyes and their use in dye-encapsulated silica nanoparticles with switchable emitting wavelengths for cellular imaging", Hong et al., Analyst, 2012, 137, 4140-4149 (12 pages).

(Continued)

*Primary Examiner* — Kuo Liang Peng
(74) *Attorney, Agent, or Firm* — Collard & Roe, P.C.

(57) ABSTRACT

The invention relates to a fluorescent siloxane elastomer, to a method for producing same, and to the use. The fluorescent siloxane elastomer contains the following structural elements in the network structure thereof: (I) and (II) or (III), wherein: R1 and R2 are the same or different and mean, independently of each other, a methyl, phenyl, vinyl substituent or an H atom; X means a saturated or unsaturated hydrocarbon group having 2 to 6 C atoms; A is an oxygen, nitrogen, or sulfur atom; R3 is a fluorescent dye substituent from the families of the BODIPY or BODIPY and coumarin or BODIPY and naphthalimide or coumarin and naphthalimide fluorophores. The polysiloxanes according to the invention cause a shift in the emission range out of the UV light or expansion of the emission range into the range of visible light having wavelengths of up to 800 nm, and therefore the polysiloxanes are especially suited for detectors having the maximum efficiency thereof in the range. In the combination of the optical, electrical, mechanical, and thermal properties of the polysiloxanes, the polysiloxanes differ substantially from polysiloxanes according to the prior art. The polysiloxanes form the basis for a material that meets the high requirements for high-voltage devices and can be used in particular for monitoring the aging process of insulating means in high-voltage systems. Partial electrical discharges can be reliably optically detected and localized by means of the polysiloxanes.

16 Claims, 9 Drawing Sheets

(56) References Cited

OTHER PUBLICATIONS

Japanese Office Action in Application No. 2018-502314 dated Apr. 24, 2019 with English Translation.
Document "Fine-Tuning Dual Emission and Aggregation-Induced Emission Switching in NPI-BODIPY Dyads", Mukherjee et al., ChemPubSoc Europe, Chemistry A European Journal. 2014 Wiley-VCH Verlag GmbH & Co. KGaA, Weinheim, 9052-9062 (11 pages).
Korean Office Action in Application No. 10-2017-7031409 dated May 17, 2019 with English translation.
Indian Examination Report in Indian Application No. 201747038129 dated Oct. 12, 2019.

* cited by examiner

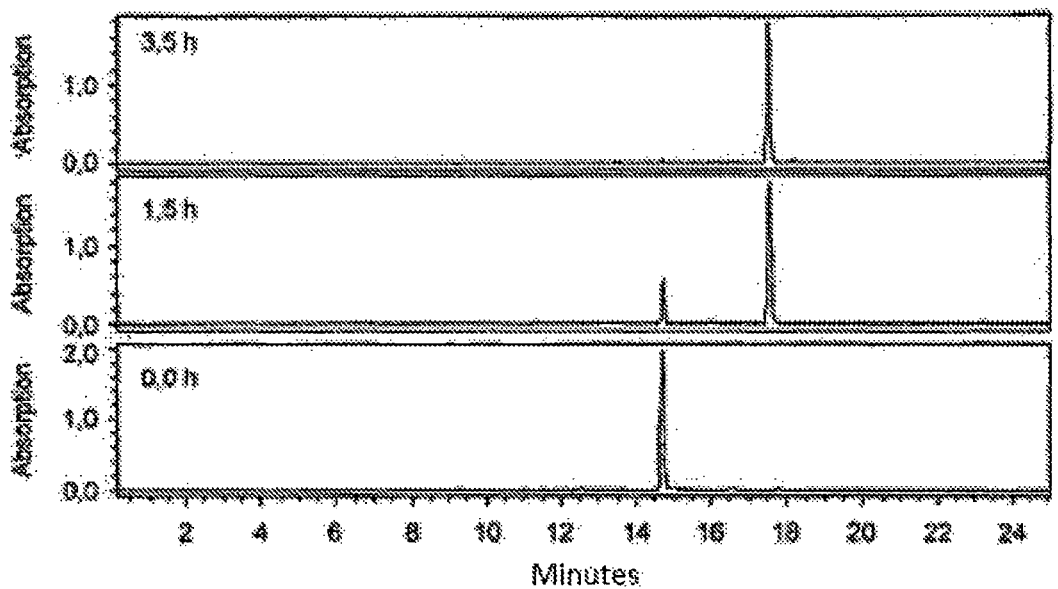
*Fig. 1: Chromatogram of the reaction of M5 with allyl bromide*
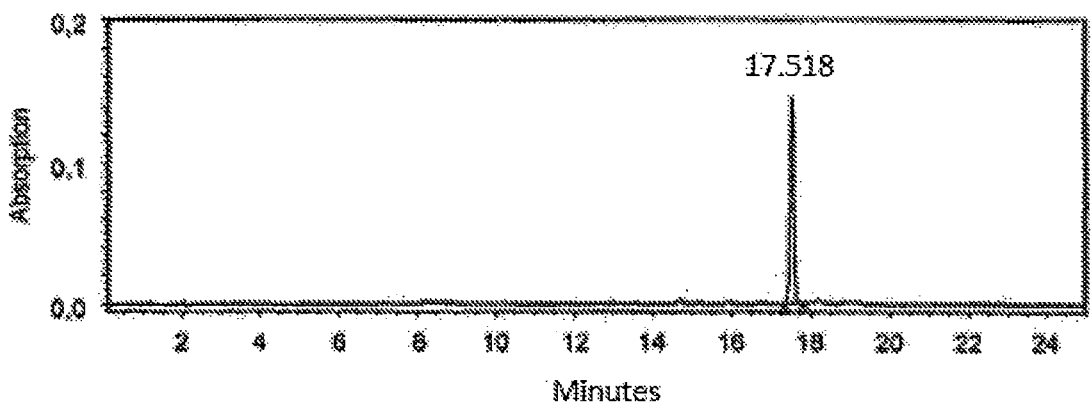
*Fig. 2: HPLC chromatogram of the dye M5-allyl after the workup*

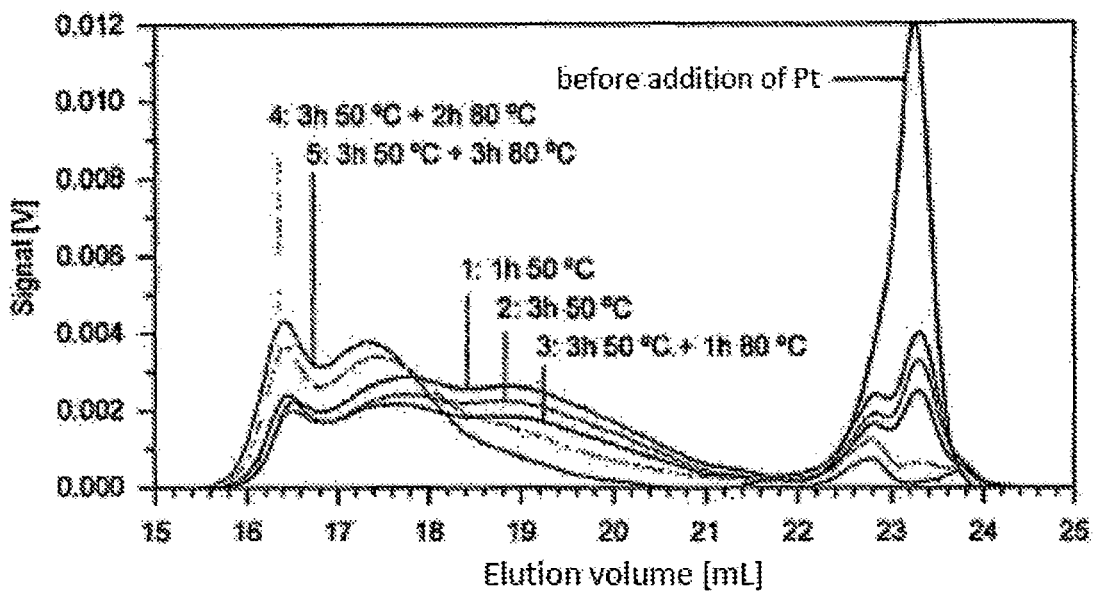
Fig. 3: GPC tracking of the covalent binding of the dye M5-allyl to an H-siloxane
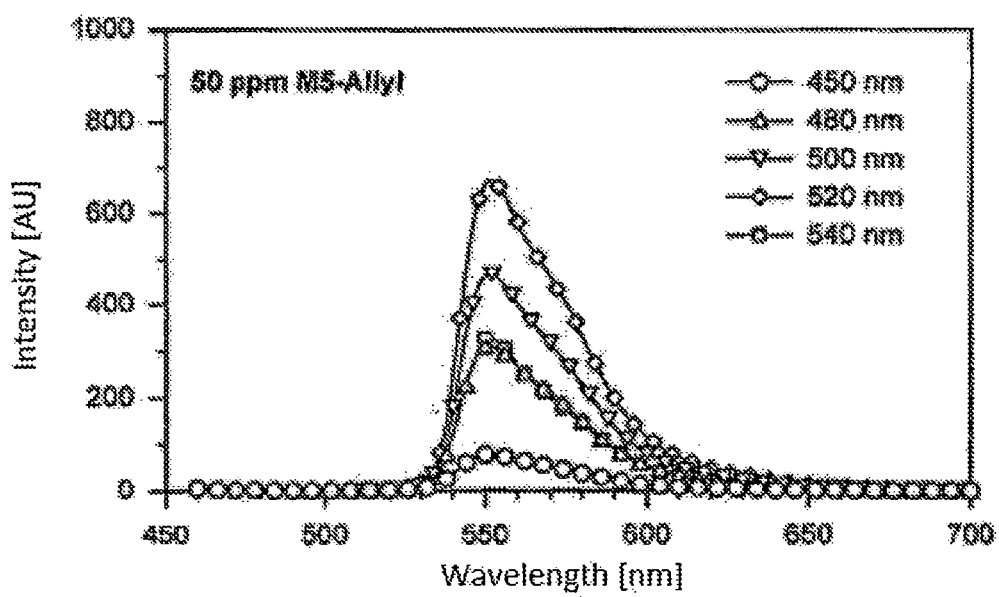
Fig. 4: Fluorescence spectra of the dye M5, covalently bound in a polysiloxane matrix, at a concentration of 50 ppm M5-allyl

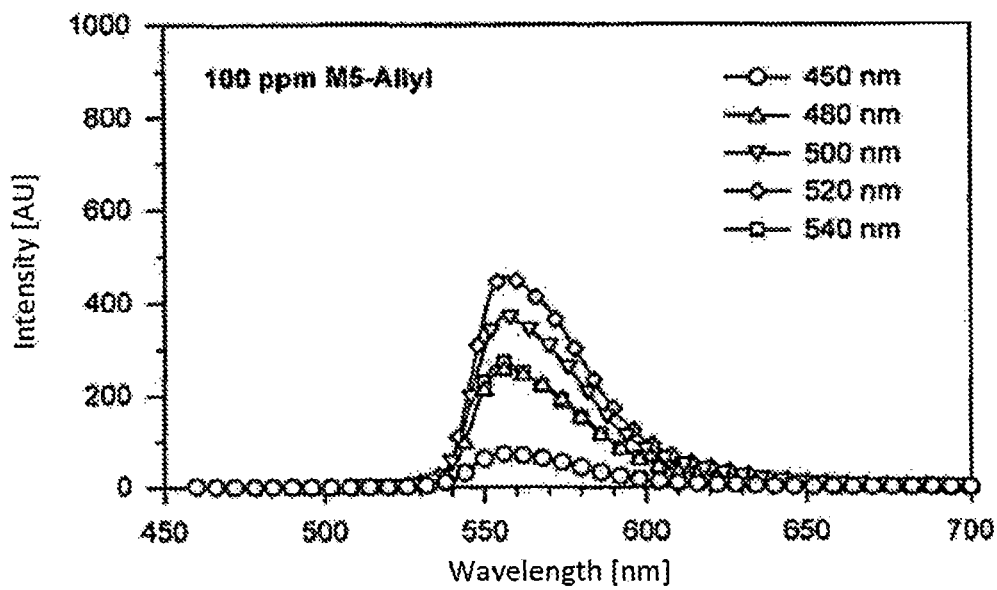
*Fig. 5: Fluorescence spectra of the dye M5, covalently bound in a polysiloxane matrix, at a concentration of 100 ppm M5-allyl*
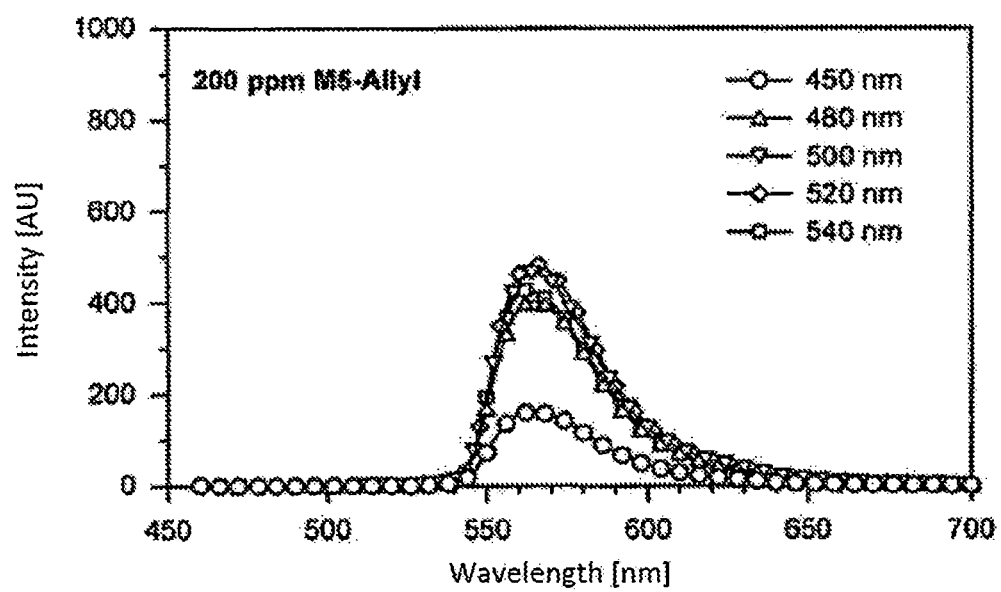
*Fig. 6: Fluorescence spectra of the dye M5, covalently bound in a polysiloxane matrix, at a concentration of 200 ppm M5-allyl*

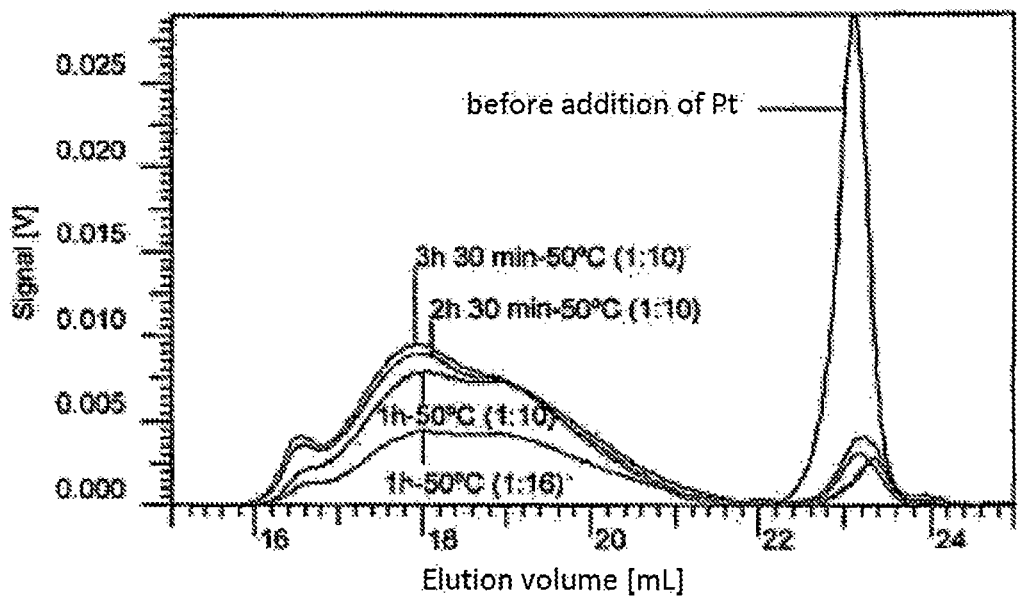
Fig. 7: GPC tracking of the covalent binding of the dye F4-allyl to an H-siloxane
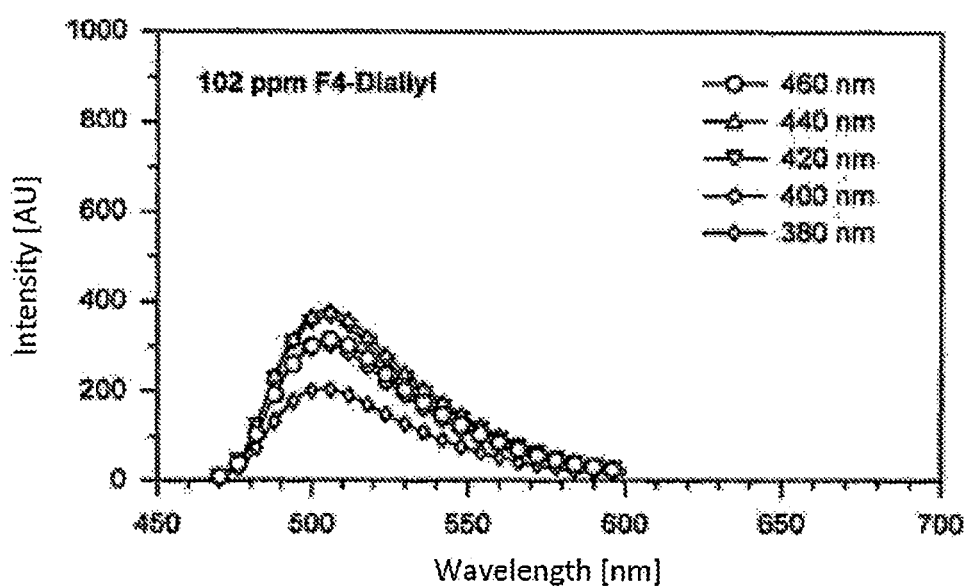
Fig. 8: Fluorescence spectra of the dye F4, covalently bound in a polysiloxane matrix

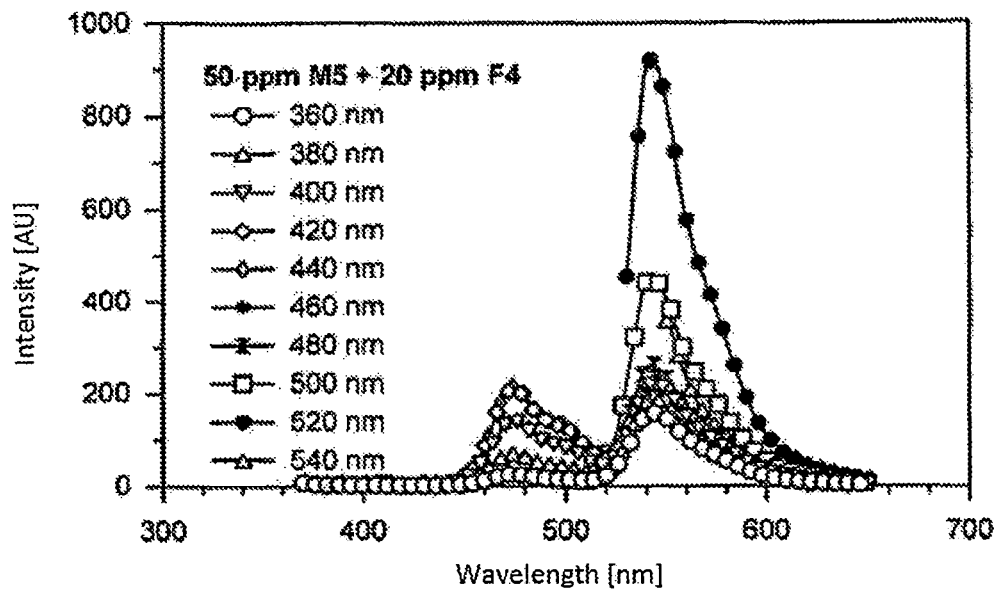
Fig. 9: Fluorescence spectra of the dye combination F4 + M5, covalently bound in a polysiloxane matrix
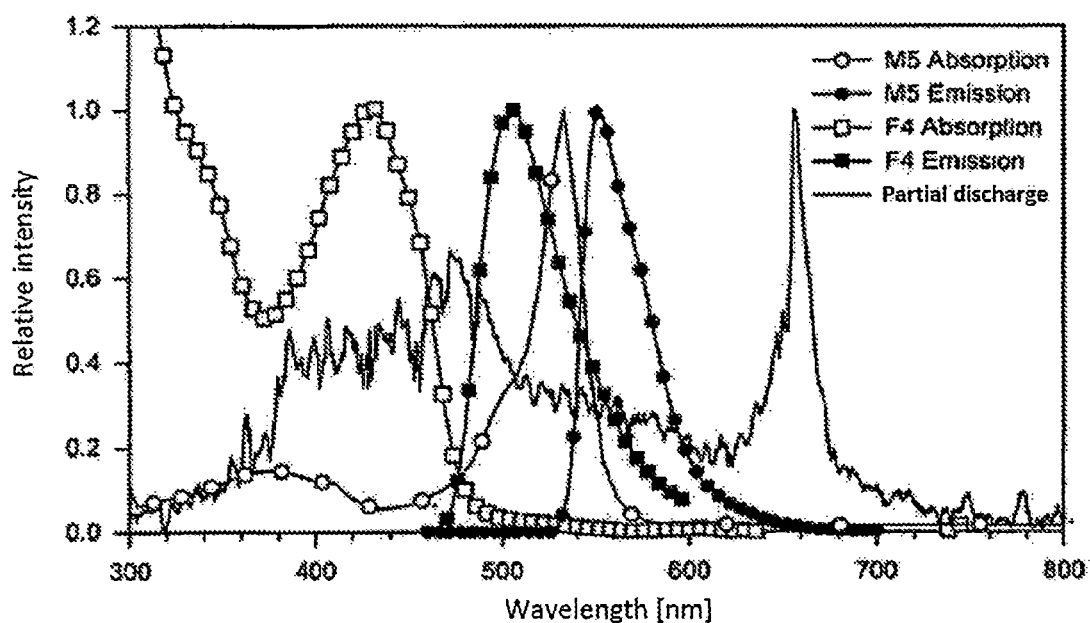
Fig. 10: Fluorescence absorption and emission spectra of the dyes F4 and M5 in comparison with the partial-discharge emission spectrum

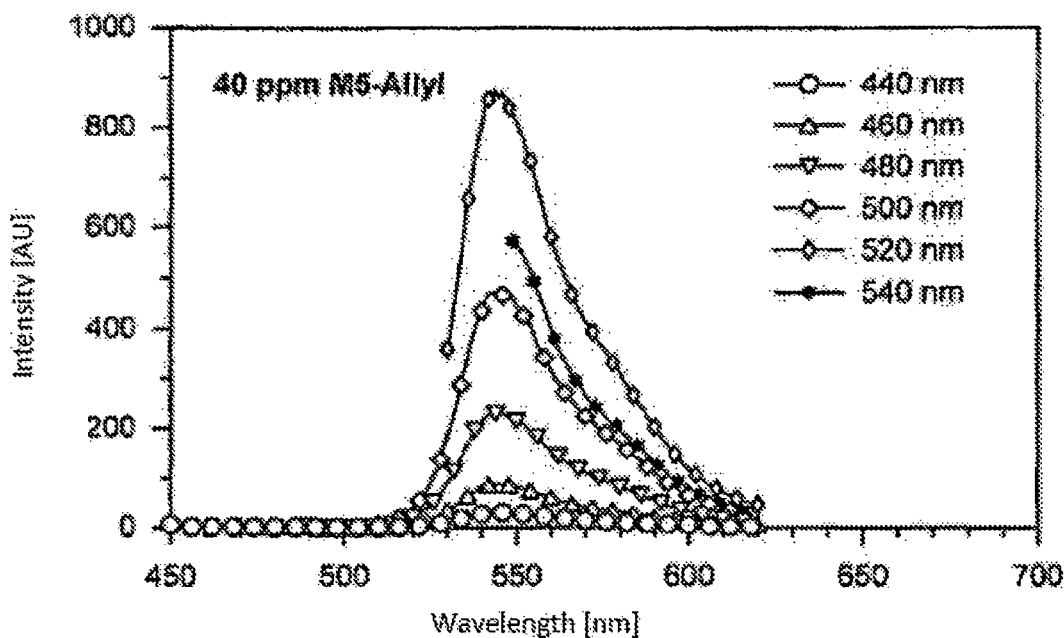
Fig. 11: Fluorescence spectra of the dye M5, covalently bound in a high-refractive-index polysiloxane matrix, dye concentration 40 ppm
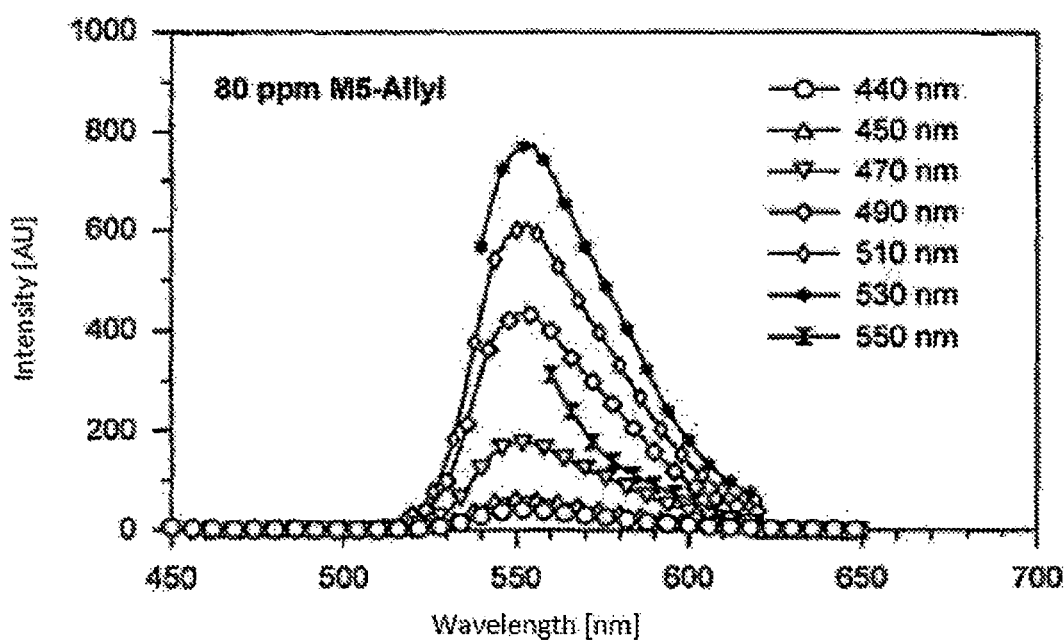
Fig. 12: Fluorescence spectra of the dye M5, covalently bound in a high-refractive-index polysiloxane matrix, dye concentration 80 ppm

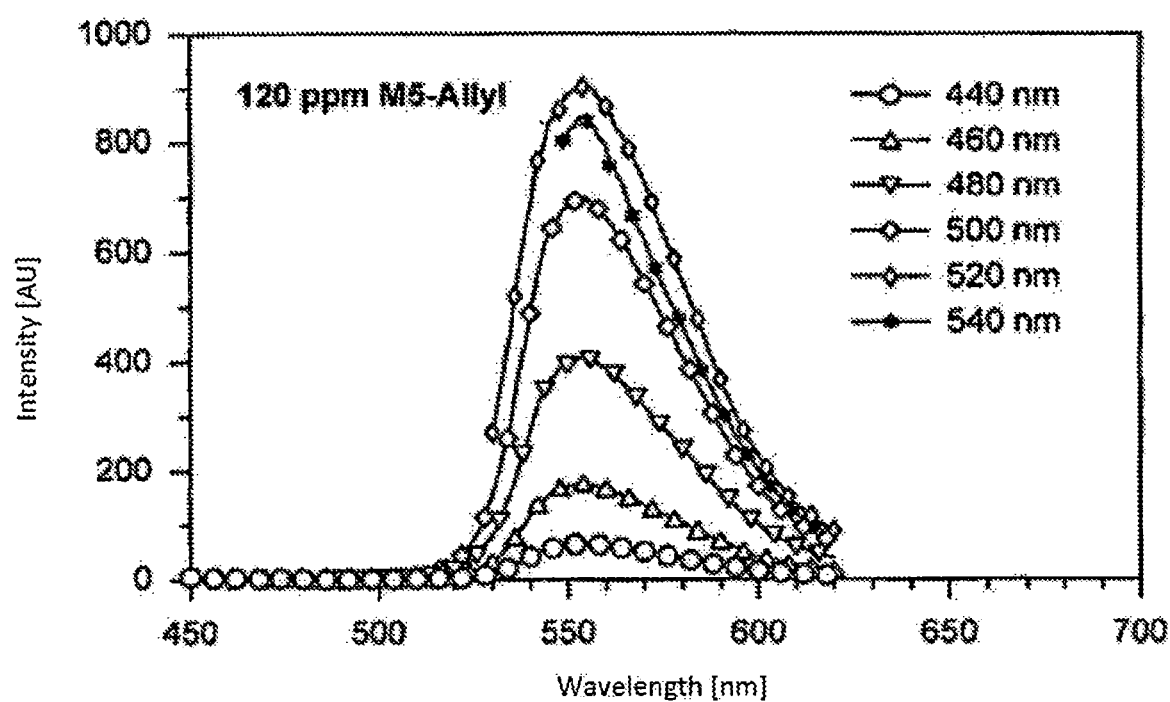
Fig. 13: Fluorescence spectra of the dye M5, covalently bound in a high-refractive-index polysiloxane matrix, dye concentration 120 ppm

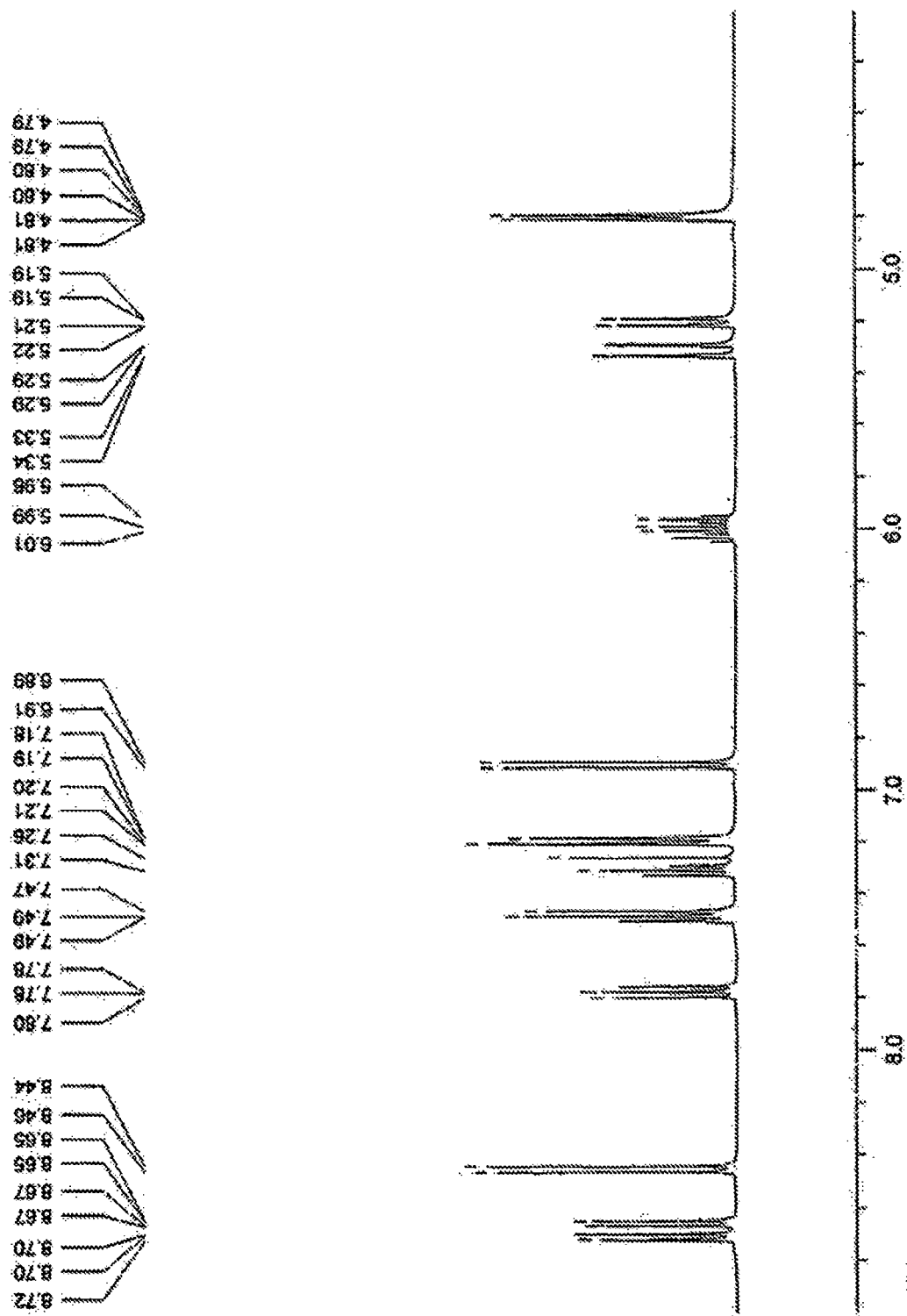
Fig. 14: Excerpt of the $^1$H-NMR spectrum in $CDCl_3$ of F6 before reaction with an excess of 1,1,3,3-tetramethyldisilane

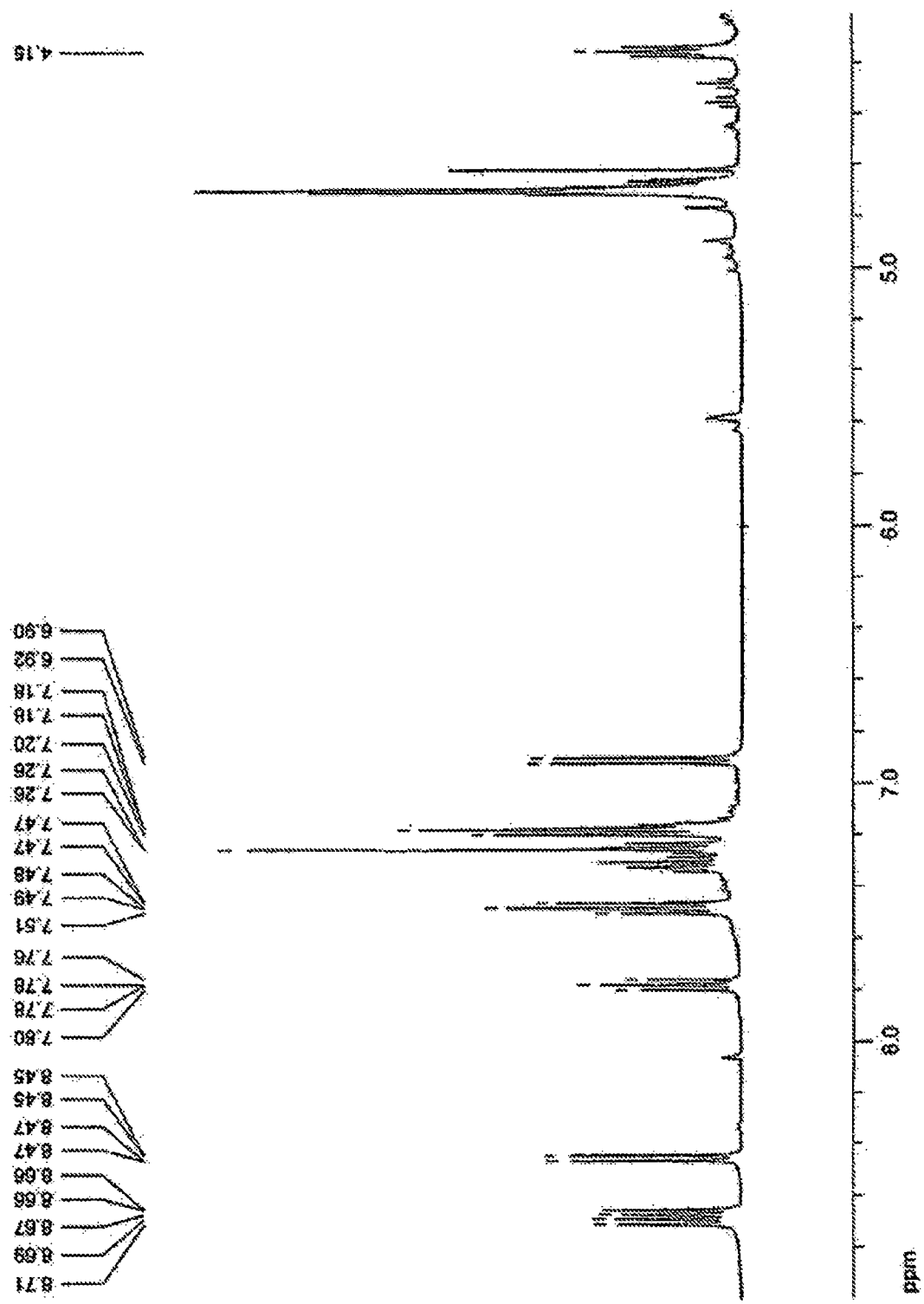
Fig. 15: Excerpt of the $^1$H-NMR spectrum in $CDCl_3$ of F6 after reaction with an excess of 1,1,3,3-tetramethyldisilane

FLUORESCENT SILOXANE ELASTOMER, METHOD FOR SYNTHESIS OF THE SAME AND THE USE

CROSS REFERENCE TO RELATED APPLICATIONS

This application is the National Stage of PCT/DE2016/000147 filed on Mar. 31, 2016, which claims priority under 35 U.S.C. § 119 of German Application No. 10 2015 004 437.0 filed on Apr. 2, 2015, the disclosures of which are incorporated by reference. The international application under PCT article 21(2) was not published in English.

The invention relates to a fluorescent siloxane elastomer and a method for synthesis of the same as well as to the use of the fluorescent siloxane elastomer.

Fluorescent compounds have the property, within a very short time after excitation by action of visible or ultraviolet light or X-rays or electron beams, of re-emitting the absorbed energy in the form of radiation of equal, longer or shorter wavelength. They therefore have a very broad scope of application and find use in many technical fields, especially in sensors for detection of optical signals.

Thus EP 2 472 688 A2 discloses a method for monitoring the process of aging of the insulation in high-voltage cable systems by use of a fiber-optic sensor. The technical further development in the field of high-voltage cable systems is associated in particular with providing accessories for the connection of cable systems, terminations and, for the connection of individual cables, junction boxes, which permit a monitoring of processes of aging of the insulations of these high-voltage devices and effectively support a remote location during failures of the insulation, for which transparent and translucent polymers are increasingly finding use.

Despite stricter requirements on the polymers to be used for junction boxes and terminations, especially with regard to high electrical insulation values, good mechanical strength and resistance to high temperatures, irreversible defects of the insulation, which are caused by partial discharges and may ultimately lead to breakdown with considerable damage, of the insulation develop repeatedly on the basis of aging phenomena, unless partial discharges are detected in timely manner by an appropriate monitoring and the concerned systems are shut down. From EP 2 472 688 A2, it may be inferred that it is possible to use, as fiber-optic sensor, a polymeric optically fluorescent optical fiber, with which the light phenomena occurring in the insulation during partial discharges are supposed to be detected.

From U.S. Pat. No. 5,585,915 B1, a polymeric fluorescent optical fiber is known on the basis of polyacrylates, polycarbonates, polystyrenes or copolymers thereof. However, such optical fibers are not compatible with the siloxane elastomers used for cable junction boxes and terminations of high-voltage cable systems. They are not sufficiently temperature-resistant and, in addition, have a relatively high stiffness, which in the presence of reversing mechanical stresses, especially bending, leads to greater optical attenuations. Furthermore, their extensibility is poor, they are brittle and therefore tend to cracking.

U.S. Pat. No. 7,323,531 B1 discloses the synthesis of a fluorescent polysiloxane. Fluorescent arylalcohols or fluorescent arylcarbinols are reacted with hydridopolysiloxanes in the presence of a platinum or rhodium catalyst with liberation of hydrogen to obtain the fluorescent polysiloxane. However, the use of the said catalysts is associated with undesired side effects. The finished product contains—as admitted in U.S. Pat. No. 7,323,531 B1—low proportions of insoluble, obviously crosslinked secondary products. The hydrogen liberated during the reaction is trapped in the fluorescent polysiloxane, to some extent with bubble formation, and imparts a certain cloudiness and porosity to the product. Because of these side effects, fluorescent polysiloxanes synthesized in this way are not suitable for the monitoring of aging processes in high-voltage devices.

FR 2900408 describes the synthesis of linear fluorescent polysiloxanes, which can be synthesized by complete reaction of the Si—H bonds present in the polymethyl-hydridosiloxane with allyl-functionalized naphthalimide-fluorophores and 2-allylhexafluoroisopropanol in various molar ratios in the presence of platinum catalysts. The resulting polymer is homogeneously soluble in organic solvents and, because of the easy quenching of its fluorescence and absence of Si—H bonds it is not suitable for the formation of durably stable fluorescent siloxane elastomers, as are needed in particular for high-voltage engineering.

In FR 2975397, syntheses of linear fluorescent polysiloxanes by hydrosilylation reaction or thiol-ene addition of alkenyl- or styryl-functionalized fluorophores are described. Pyrene, quinacridone, naphthalimide and fluorescein are claimed as fluorophores. Polymethylhydridosiloxanes or their copolymers and poly(mercaptopropylmethylsiloxanes) are used as polysiloxanes. The syntheses are controlled such that all available Si—H and HS bonds are reacted with fluorophores and if necessary special substituents such as, for example, 2-allylhexafluoroisopropanol or 4-vinylaniline or 1-octene. The polymers synthesized in this way are homogeneously soluble in organic solvents and can be processed from the solution to obtain thin layers. Moreover, they are diffusion-permeable for the penetration of various gaseous molecules, which cause quenching of the fluorescence.

Because of these properties and of the chemical structure (absence of Si—H bonds, long-chain hydrocarbons in the side chain), these polymers likewise are not suitable for the formation of durably stable fluorescent siloxane elastomers for high-voltage engineering.

EP 0455384 discloses the synthesis of a coumarin-substituted polysiloxane by a polycondensation reaction. For this purpose, the 7-chlorodimethylsilylpropoxycoumarin is first hydrolyzed and simultaneously condensed with dimethyldichlorsilane in the presence of water to obtain a coumarin-terminated polydimethylsiloxane. In the next step, an H-siloxane block is inserted into the linear coumarin-terminated polydimethylsiloxane chain by subsequent cohydrolysis and ring-opening with tetramethylcyclotetrasiloxane in the presence of trifluorosulfonic acid. The A-component synthesized in this way is then mixed with common vinylsiloxanes and platinum catalysts in component B and crosslinked at higher temperatures.

The disadvantage of this method lies in the synthesis of the A-component by the polycondensation reaction. This reaction is an equilibrium reaction between linear and cyclic siloxanes. The tendency to formation of the cyclic structures is greater the more voluminous the substituent on the Si atom is. Coumarin-substituted cyclo(tetra/penta/hexa)siloxanes that cannot be completely cleaved by the trifluorosulfonic acid are formed. In the final effect, the A-component synthesized in this way contains diffusion-permeable coumarin-substituted cyclosiloxanes, which weaken the fluorescence intensity and, together with other impurities from the synthesis process, such as chloride ions, trifluorosulfonic acid and traces of water, lower the breakdown strength of such siloxane elastomers. Because of this, they are not suitable for high-voltage engineering.

From US 2015/0153229 A1, fluorescent siloxane-hybrid resins are known that are synthesized by polycondensation reaction of alkoxysilylated fluorescent dyes with organosilanediols and functionalized alkoxysilanes. Among other compounds, rhodamines, coumarins, fluorescein and perylenes are used as fluorescent dyes. The functionalized alkoxysilanes carry a 3-glycidyloxypropyl, 3-acryloxypropyl, 3-methacryloxypropyl, 3-aminopropyl group or a vinyl group or mixtures thereof as the functional group. The polycondensation reaction is catalyzed with addition of up to 10% metal hydroxides such as, for example barium- or strontium hydroxide. The siloxane hybrid resin synthesized in this way is crosslinked thermally in the presence of sodium hydroxide or with UV light in the presence of up to 4% photoinitiators, such as, for example allylsulfonium hexafluoroantiminate. The disadvantage of this method is the formation of cyclic siloxanes, which in particular are substituted with the fluorescent dyes and are able to diffuse out of the crosslinked siloxane hybrid resin both at room temperature and under the influence of temperature and high voltage. A further disadvantage is the metal hydroxides and photoinitiators that remain in the material and that negatively influence the electrical and optical properties of the material.

The task of the invention therefore consists in providing a fluorescent elastomer of high purity, which has a high elongation to break and flexibility and in addition is resistant to high temperature and aging, has a high breakdown strength and in particular satisfies the absorption and emission properties relevant for the detection of partial discharges in high-voltage systems.

Furthermore, the task of the invention consists in providing a method for synthesis of the fluorescent elastomer.

According to the invention, the task is accomplished by a fluorescent siloxane elastomer that contains, in its network structure, the following structural elements:

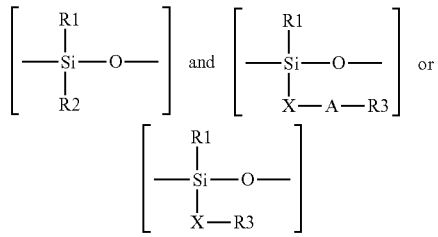

where:
R1 and R2 are identical or different and independently of one another respectively denote a methyl, phenyl, vinyl substituent or an H atom;
X denotes a saturated or unsaturated hydrocarbon group with 2 to 6 C atoms;
A represents an oxygen, nitrogen or sulfur atom;
R3 is a fluorescent dye substituent from the families of the BODIPY or BODIPY and Coumarin or BODIPY and naphthalimide or coumarin and naphthalimide fluorophores.

The benefit that electrical partial discharges in high-voltage systems can be detected optically is associated with this fluorescent siloxane elastomer according to the invention. Compared with the electrical partial-discharge-measuring systems used routinely (e.g. MPD 600 of OMICRON Electronics GmbH, Austria), the optical or fiber-optic detection method is not susceptible to electromagnetic radiation, which always represents a troublesome basic interference level in measurements. Compared with commercial acoustic partial-discharge-measuring systems (e.g. PDL 650 of OMICRON Electronics GmbH, Austria or TransiNor DFA 100 of Doble Engineering Company, USA), the optical partial-discharge detection offers the advantage of being far more sensitive and of being able to reliably detect partial discharges with an apparent charge of as low as 1 pC. In addition, a localization of the partial discharges in the individual components and thus a fault location is possible by the use of fluorescent siloxane elastomers as sensor materials.

All transparent or translucent addition-crosslinking siloxanes are suitable as the matrix. Some commercially available siloxane systems that are suitable for functionalization are mentioned in the following. However, this list does not make any claim to completeness of all materials available on the market. The products LR 7665, LR 7600, RT 601, RT 604, LR 3003 (Wacker Chemie AG, Germany), OE 6630, OE 6636, OE 6550, OE 6520 (Dow Corning Corp., USA), RTV 655, RTV 615 (Momentive Performance Materials Inc, USA) and LS 6257, LS 6143, LS 6943, MED-6210 (NuSil Technology LLC, USA) are suitable for the functionalization.

According to a particularly preferred embodiment of the invention, the BODIPY-dye substituent R3 has the following general formula

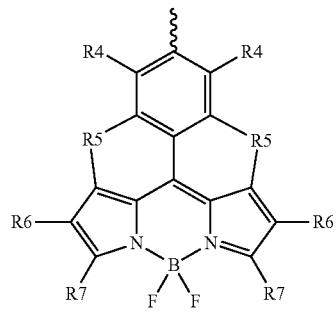

in which
R4, R5 may be identical or different and denote a hydrogen atom, a fluorine atom or a trifluoromethyl radical,
R6 represents a $CH_3$ or $C_2H_5$ group;
R7 denotes a $CH_3$, $C_2H_5$, 4-dimethylaminostyryl, 3,5-ditrifluoromethylstyryl or 4-dimethylaminonaphthylvinyl radical.

A further particularly preferred embodiment of the invention provides that the coumarin-dye substituent R3 has the general formula

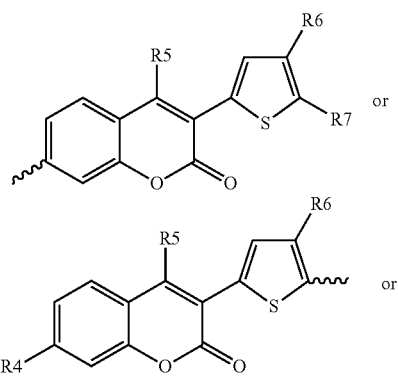

-continued

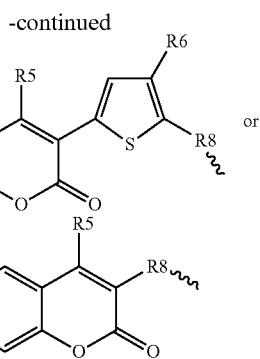

in which:
R4 denotes an H atom or an OCH₃, NHCH₃, N(CH₃)₂, NH(C₂H₅) or N(C₂H₅)₂ radical;
R5 may be an H atom or an F atom or a CH₃ or CF₃ radical;
R6, R7 may be identical or different and denote an H atom or a CH₃ group;
R8 represents a COO, CONH, CON(CH₂—CH=CH₂) or SO₂NH, SO₂N(CH₂—CH=CH₂) group.

According to a further particularly preferred embodiment of the invention, the naphthalimide-dye substituent R3 has the following general formula

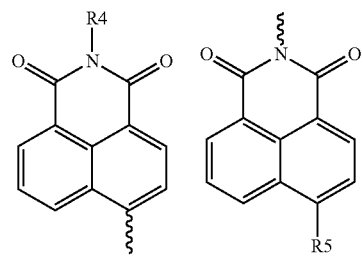

in which
R4 may be a CH₃, C₂H₅, C₃H₇, phenyl, mesityl or a (2,6-diisopropyl)phenyl radical;
R5 denotes an H atom or a CH₃, OCH₃, or O(C₆H₅) radical.

Further embodiments of the fluorescent polysiloxane according to the invention are characterized in that they have a refractive index that lies in the range of 1.40 to 1.60 and/or in that after the curing it is a transparent or translucent elastomer, in that it has absorption and emission maxima in the wavelength range of 300 nm to 800 nm, it is temperature-resistant up to 150° C. and/or is aging-resistant in the electrical field of a high-voltage device for voltages from 1 kV to 500 kV, has a dye concentration of 5 ppm to 500 ppm and has an elongation to break of up to 400%.

Advantageously, the fluorescent siloxane elastomer contains a filler, preferably fumed silica or titanium dioxide or aluminum oxide or zirconium oxide.

According to the invention, the task of synthesis of a fluorescent siloxane elastomer is accomplished by a method that comprises the following stages:
Functionalization of the dye with an unsaturated hydrocarbon group for a hydrosilylation reaction in a polar solvent at elevated temperature and under a nitrogen atmosphere at normal pressure or at elevated pressure,
Reaction of the functionalized dye with an H-siloxane in a nonpolar solvent in the presence of platinum or rhodium as the hydrosilylation catalyst at room temperature or an elevated temperature;
Removal of the catalyst by means of a sorbent and of the solvent under reduced pressure;
Mixing of an addition-crosslinking, two-component siloxane mixture with the functionalized H-siloxane at room temperature,
Curing of the siloxane mixture at an application-specific temperature of up to 200° C.

Preferred embodiments of the method according to the invention provide that the polar solvent is acetonitrile or an alcohol and the nonpolar solvent is toluene or another aromatic hydrocarbon, an aliphatic or a chlorinated hydrocarbon, a cyclic ether or a vinylsiloxane.

According to a particularly preferred embodiment, the sorbent is "Spheropor H" of Polymerics GmbH, which is a copolymer of divinylbenzene and vinylimidazole.

Furthermore, the invention provides the use of the fluorescent siloxane elastomer for the production of sensors for detection of partial discharges in high-voltage devices, for the production of sensors as optical waveguides in the form of fibers, plates, strips, disks or segments and also as material for high-voltage devices.

BRIEF DESCRIPTION OF THE DRAWINGS

The invention will be explained in more detail in the following on the basis of examples, each in conjunction with drawings. There are denoted or shown by:
Example 1: Allylation of the BODIPY fluorescent dye M5
FIG. 1 Chromatograms of the reaction of M5 with allyl bromide
FIG. 2 HPLC chromatogram of the dye M5-allyl after workup
Example 2: Covalent binding of the dye M5-allyl to an H-siloxane
FIG. 3 GPC graph of the covalent binding of the dye M5-allyl to an H-siloxane
Example 3: Synthesis of a fluorescent polysiloxane with a refractive index of 1.43 and covalently bound dye M5
FIG. 4 Fluorescence spectra of the dye M5, covalently bound in a polysiloxane matrix, at a concentration of 50 ppm M5-allyl
FIG. 5 Fluorescence spectra of the dye M5, covalently bound in a polysiloxane matrix, at a concentration of 100 ppm M5-allyl
FIG. 6 Fluorescence spectra of the dye M5, covalently bound in a polysiloxane matrix, at a concentration of 200 ppm M5-allyl
Example 4: Synthesis of the coumarin dye F4
Example 5: Covalent addition of the dye F4 to an H-siloxane
FIG. 7 GPC graph of the covalent binding of the dye F4-allyl to an H-siloxane
Example 6: Synthesis of a fluorescent polysiloxane with a refractive index of 1.43 and covalently bound dye F4
FIG. 8 Fluorescence spectra of the dye F4, covalently bound in a polysiloxane matrix
Example 7: Synthesis of a fluorescent polysiloxane with a refractive index of 1.43 and covalently bound dyes F4 and M5
FIG. 9 Fluorescence spectra of the dye combination F4+M5, covalently bound in a polysiloxane matrix
FIG. 10 Fluorescence absorption and emission spectra of the dyes F4 and M5 in comparison with the partial-discharge emission spectrum Example 8: Synthesis of fluorescent polysiloxanes with a refractive index of 1.54 and covalently bound dye M5

FIG. 11 Fluorescence spectra of the dye M5, covalently bound in a high-refractive-index polysiloxane matrix FIG. 12 Fluorescence spectra of the dye M5, covalently bound in a high-refractive-index polysiloxane matrix, dye concentration 80 ppm FIG. 13 Fluorescence spectra of the dye M5, covalently bound in a high-refractive-index polysiloxane matrix, dye concentration 120 ppm Example 9: Synthesis of the naphthalimide dye F6

FIG. 14 Excerpt of the $^1$H-NMR spectrum in $CDCl_3$ of F6 before reaction with an excess of 1,1,3,3-tetramethyldisilane FIG. 15 Excerpt of the $^1$H-NMR spectrum in $CDCl_3$ of F6 after reaction with an excess of 1,1,3,3-tetramethyldisilane Example 10: Determination of mechanical properties Example 11: Determination of electrical properties

EXAMPLES

Example 1

Allylation of the BODIPY Fluorescent dye M5

The fluorescent dye M5 used (Hecht M. et al., Chemistry Open 2 (2013), pp. 25-38, DOI: 10.1002/open.201200039) has the following structure:

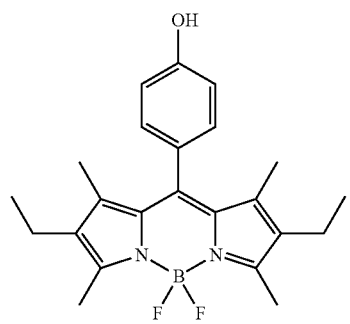

Systematic name according to IUPAC: 8-(4-hydroxyphenyl)-1,3,5,7-tetramethyl-2,6-diethyl-4,4-difluoro-4-bora-3a,4a-diaza-s-indacene Synthesis In a 10-mL microwave pressure vessel with septum, 70 mg (0.177 mmol) of the dye M5 in 8 mL n-propanol was introduced first then 8.5 mg (0.212 mmol) NaOH was added with stirring. The reaction mixture was stirred at room temperature until complete dissolution. A zero sample (10 µL reaction solution) was withdrawn, diluted with 990 µL acetonitrile and investigated with HPLC. Thereupon 25.6 mg (18 µL, 0.212 mmol) allyl bromide was added then the vessel was tightly sealed and heated to 95° C. To follow the reaction, 10-µL samples of reaction solution were withdrawn after 1.5 h and after 3.5 h respectively, diluted with acetonitrile as above and investigated with HPLC. FIG. 1 shows the chromatograms obtained. The degree of conversion determined by means of HPLC (at 520 nm) was 98%.

Analytics

Tracking of the degree of conversion was carried out on a Waters-HPLC "alliance 2625" system with diode array detector and a Gemini C18 column (Phenomenex GmbH) at 35° C.

Acetonitrile/water with a gradient from 20:80 to 95:05 was used as eluent. The determination of the degree of conversion was carried out by means of the peak-area integration method at 520 nm.

Workup of the Reaction Solution

The reaction was ended after 4 h, the reaction solution was filtered over a glass frit and washed several times with n-propanol. Then the filtrate was evaporated to dryness on the rotary evaporator. The solid residue was taken up in 15 mL of a mixture of tert-butyl methyl ether and cyclohexane then transferred into a separating funnel.

The organic phase was then washed three times in succession with respectively 10% KOH, 5% $NaHCO_3$ and distilled water and then was dried overnight over sodium sulfate.

The dried organic phase was filtered off from the sodium sulfate and the filtrate was evaporated to dryness on the rotary evaporator. The residue was dried to constant weight in the circulating-air oven then weighed. The yield was 69.5 mg, or 90% of theory. The purity of the worked-up product was retested with the HPLC (FIG. 2). The fine purification of the product was then carried out on a preparative chromatography system (Waters Inc., USA) with an XTerra-C18 column (21 mm dia.×150 mm) with acetonitrile/water as the mobile phase and photodiode array-detector.

Example 2

Covalent Binding of the Dye M5-Allyl to an H-Siloxane

Synthesis

In a 10-mL two-necked flask equipped with reflux condenser, water bath and magnetic stirrer, 1.25 g HMS-501 (ABCR GmbH) in 1.5 mL toluene was dissolved with stirring. Then 4 mg of the dye M5-allyl (M=436.8 g/mol) from Example 1 was dissolved at room temperature with stirring and 50 µL reaction solution, diluted with 1 mL THF, was withdrawn as the zero sample for the GPC investigation. HMS-501 is a low molecular weight H-siloxane (M=1000 g/mol), consisting of approximately 50 mol % methyl hydride siloxane and 50 mol % dimethylsiloxane basic units, which is not visible in the GPC chromatogram with THF as the mobile phase. Therefore the zero sample in FIG. 3 exhibits only the signal of the dye M5-allyl at an elution volume of 24.3 mL. Instead of toluene, it is also possible to use another aromatic hydrocarbon, a cyclic ether, a chloroalkane or a vinylsiloxane or even an aliphatic hydrocarbon as the solvent.

The reaction solution was then purged for 7 minutes with nitrogen and sealed with a septum as well as an $N_2$ balloon. Then 10 µL of the diluted platinum catalyst SIP 6831.2 (ABCR GmbH, dilution 1:10 with xylene) was added via the septum and the reaction temperature was raised to 50° C. For tracking of the conversion, 50 µL of reaction solution was withdrawn every hour, diluted with 1 mL THF and investigated with the GPC. The chromatograms obtained are presented in FIG. 3. It is also possible to use rhodium as the catalyst.

After 3 h of reaction time at 50° C., the reaction temperature was raised to 80° C. and stirring was continued at this temperature for a further 3 h. The GPC chromatograms in FIG. 3 show that, after this time, the dye M5-allyl is covalently bound almost completely to the H-siloxane. The covalently modified H-siloxane is now visible at a broader peak between 22 mL and 16 mL elution volume, whereas the dye peak at 23 mL is still present only in traces.

Analytics

For tracking of the reaction, a GPC system (Knauer GmbH, Berlin, Germany) with UV and RI detectors and 3 PL gel 300×7.5 mm GPC columns (Polymer Laboratories Ltd., Great Britain) with exclusion limits of 100 Å, 500 Å and Mixed-B was used. THF with a flow velocity of 1 mL/min was used as the mobile phase.

Workup of the Reaction Product

For removal of the catalyst and of dye residues, the reaction mixture was diluted with 1.5 mL toluene and filtered through a 6-mL SPE column packed with 200 mg "Spheropor H" sorbent (Polymerics GmbH, Berlin, Germany) and post-rinsed 2 times with 1.5 mL toluene. The filtrates were then freed from toluene at 60° C. and 21 mbar vacuum on the rotary evaporator. 1.0528 g of yellow-fluorescing H-siloxane was obtained as an orange liquid. This siloxane was labeled as H-siloxane-M5.

Example 3

Synthesis of a Fluorescent Polysiloxane with a Refractive Index of 1.43 and Covalently Bound Dye M5

For the synthesis, the addition-crosslinking 2-component siloxane system MED 6210 (Nusil Technology LLC, Carpinteria, Calif., USA) according to Table 1 was weighed in and homogenized.

TABLE 1

Test specimens of MED 6210, covalently modified with M5

| No. | MED 6210 A | MED 6210 B | H-siloxane-M5 | M5 concentration in the matrix |
|---|---|---|---|---|
| 1 | 2 g | 1.935 g | 0.062 g | 50 ppm |
| 2 | 2 g | 1.875 g | 0.125 g | 100 ppm |
| 3 | 2 g | 1.750 g | 0.250 g | 200 ppm |

The homogenized mixtures were then deaerated in the vacuum drying chamber and cured between two polycarbonate plates with 1-mm spacers in the circulating-air oven for 2 h at 120° C. to obtain transparent, pink-colored plate-shaped test specimens with a geometry of 50 mm×50 mm×1 mm.

The test specimens obtained in this way were excited with monochromatic wavelengths of 450 nm to 540 nm in the fluorescence spectrometer (Varian Inc., USA, Equlip model) and the respective fluorescence spectrum was recorded. The fluorescence emission spectra of samples 1 to 3 are presented in FIG. 4, FIG. 5 and FIG. 6. The fluorescence spectra show that the covalently bound dye M5 in the MED 6210 polysiloxane matrix absorbs in the wavelength range from 450 nm to 540 nm, and in the wavelength range from 530 nm to 650 nm emits an intense fluorescence inversely proportional to the concentration of the dye in the matrix.

The determination of the fluorescence quantum yield of this fluorescent polysiloxane unexpectedly yielded the same value of $\Phi_F=0.92$ as for the non-covalently bound dye M5 in diethyl ether. The binding of the dye to the polysiloxane chain did not reduced its emission intensity.

Furthermore, an extraction experiment (72 h with $CH_2Cl_2$) showed that the bound dye is resistant to migration. This means that the optical properties of this polymer can advantageously be stably preserved over the long term.

Example 4

Synthesis of the Coumarin Dye F4

The synthesized fluorescent dye F4 has the following structure:

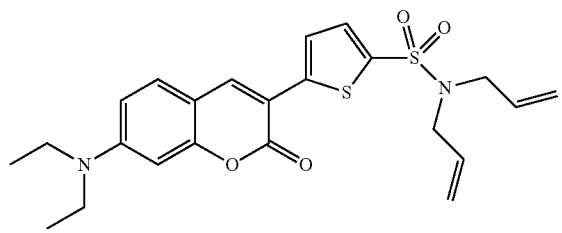 [SMILES: C=CCN(CC=C)S(=O)(=O)c1ccc(-c2cc3ccc(N(CC)CC)cc3oc2=O)s1]

400 mg 7-diethylamino-3-thiophen-2-yl-chromen-2-one (FEW Chemicals GmbH, Germany) was introduced first into a single-necked flask and dissolved in 20 mL chloroform. Then 2 mL chlorosulfonic acid was added dropwise at 0° C. and the reaction solution was heated slowly to room temperature within 30 minutes. After 2 hours, ice water was added to the red reaction solution. The reddish precipitate was removed by suction, washed with 50 mL each of saturated sodium hydrogen carbonate solution, water (2 times) and methanol (2 times) and then dried in vacuum.

In a single-necked flask, 0.109 g diallylamine hydrochloride was introduced first and dissolved in a mixture of 6 mL acetonitrile, 4 mL chloroform and 3 mL triethylamine. To this solution, 236 mg of the reddish sulfochloride was added with stirring, then the mixture was stirred for 16 hours at 50° C. Then the solvent was removed under reduced pressure and the raw product was taken up in 50 mL dichloromethane. The green solution was washed with 50 mL each of saturated sodium hydrogen carbonate solution (2 times), 10% citric acid (2 times) and saturated aqueous sodium chloride solution then dried over magnesium sulfate. The residue was then purified by column chromatography on silica gel 60 and the product was eluted with a mixture of dichloromethane and cyclohexane (3:1). After the solvent mixture was removed in vacuum, 197 mg of F4 was obtained.

$^1$H NMR (400 MHz): δ[ppm]=7.99 (s, 1H), 7.52 (d, J=1.2 Hz, 2H), 7.36 (d, J=8.9 Hz, 1H), 6.65 (dd, J=8.7, 2.7 Hz, 1H), 6.54 (d, J=2.5 Hz, 1H), 5.70 (tdd, J=16.6, 10.1, 6.4 Hz, 2H), 5.19 (ddd, J=17.1, 1.2 Hz, 4H), 5.17 (ddd, J=10.7, 1.2 Hz, 4H), 3.85 (d, J=6.3 Hz, 4H), 3.45 (q, J=7.2 Hz, 4H), 1.24 (t, J=7.1 Hz, 6H).

Quantum yield of F4 ($10^{-5}$ M) in Momentive RTV 655: $\lambda_{ex}$ (421)=0.89.

Example 5

Covalent Addition of the Dye F4 to an H-Siloxane

Synthesis

By analogy with Example 2, 1.25 g HMS-501 (ABCR GmbH, Germany) was dissolved in 4 mL toluene in a 10-mL two-necked flask equipped with reflux condenser, magnetic stirrer and water bath, and 4 mg (8.72·$10^{-6}$ mol) of the coumarin dye F4 (M=458.59 g/mol) was added. The dye dissolved gradually with stirring at 50° C. After dissolution, 30 μL of the reaction mixture was withdrawn as zero sample, diluted with 450 μL THF and investigated with the GPC. The reaction apparatus was then purged for 7 minutes with nitrogen and sealed with a septum as well as an N₂ balloon. Then 10 μL of the diluted platinum catalyst (SIP 6831.2 of ABCR GmbH, Germany, dilution 1:10 with xylene) was added via the septum and the reaction was started at 50° C. For tracking of the conversion, 4 samples of 30 μL were withdrawn within a reaction time of 3.5 h, diluted as above and investigated with the GPC. The GPC chromatograms obtained are presented in FIG. 7. The comparison of the different graphs shows that the reaction is largely completed after 3.5 h.

Surprisingly, no crosslinking of the H-siloxane was observed during the reaction, despite two reactive allyl substituents.

Workup of the Reaction Product

For removal of the catalyst and of the unreacted dye residues, the reaction mixture was filtered through a 6-mL SPE column containing 200 mg "Spheropor H" sorbent (Polymerics GmbH, Berlin, Germany) and post-rinsed 2 times with 1.5 mL toluene. The filtrates were united and freed from toluene at 60° C. and 21 mbar vacuum on the rotary evaporator. 1.0151 g of fluorescent H-siloxane was obtained as green liquid. This H-siloxane was labeled as H-siloxane-F4.

Example 6

Synthesis of a Fluorescent Polysiloxane with a Refractive Index of 1.43 and Covalently Bound Dye F4

For the synthesis, the addition-crosslinking 2-component siloxane MED 6210 (Nusil Technology LLC, Carpinteria, Calif., USA) according to Table 2 was weighed in and homogenized.

TABLE 2

Test specimens of MED 6210, covalently modified with F4

| No. | MED 6210 A | MED 6210 B | H-siloxane-F4 | F4 concentration in the matrix |
|---|---|---|---|---|
| 4 | 1.5 g | 1.404 g | 0.096 g | 102 ppm |

Then the mixture was deaerated in the vacuum drying chamber and cured between two polycarbonate plates with spacers of 1 mm to obtain a transparent, green-colored plate with a geometry of 40 mm×40 mm×1 mm. Curing took place for 2 h at 120° C.

The plate obtained in this way was excited with monochromatic light of wavelengths of 380 nm to 460 nm in the fluorescence spectrometer (Varian Inc., USA, Equlip model) and the respective fluorescence emission spectrum was recorded. The fluorescence emission spectrum of sample 4 is presented in FIG. 8. The fluorescence spectra in FIG. 8 show that the covalently bound dye F4 in the MED 6210 polysiloxane matrix can be advantageously excited in the UV range with wavelengths of 380 nm to 460 nm and in the visible range between 470 nm and 600 nm emits an intense fluorescent light.

Example 7

Synthesis of a Fluorescent Polysiloxane with a Refractive Index of 1.43 and Covalently Bound Dyes F4 and M5

For the synthesis, the addition-crosslinking 2-component siloxane MED 6210 (Nusil Technology LLC, Carpinteria, Calif., USA) with a refractive index of 1.43 according to Table 3 was weighed in and homogenized.

TABLE 3

Test specimens of MED 6210, covalently modified with F4 and M5

| No. | MED 6210 A | MED 6210 B | H-siloxane-F4 | H-siloxane-M5 |
|---|---|---|---|---|
| 5 | 2 g | 1.913 g | 0.025 g | 0.062 g (50 ppm) |

Then the mixture was deaerated in the vacuum drying chamber and cured between two polycarbonate plates with spacers of 1 mm for 2 h at 120° C. to obtain a transparent, green-yellow-fluorescing plate with a geometry of 40 mm×40 mm×1 mm. The plate obtained in this way was excited with monochromatic light of wavelengths of 360 nm to 540 nm in the fluorescence spectrometer and the respective response was recorded as the fluorescence emission spectrum. The fluorescence emission spectra of sample 5 are presented in FIG. 9. FIG. 10 shows the fluorescence absorption and emission spectra of the dyes F4 and M5 in comparison with a partial-discharge emission spectrum.

Surprisingly, the fluorescence emission spectra in FIG. 9 show that the covalently bound dyes F4 and M5 in the polysiloxane matrix add together very well and do not quench one another in their spectral properties. The material exhibits an expanded absorption range from 360 nm to 540 nm and a likewise expanded emission range, which extends from 450 nm to 650 nm. Consequently, the material according to the invention has advantageous properties of effectively absorbing partial-discharge wavelengths and of emitting in the sensitivity range of wavelengths matching APD detectors (FIG. 10).

Example 8

Synthesis of Fluorescent Polysiloxanes with a Refractive Index of 1.54 and Covalently Bound Dye M5

For the synthesis, the 2-component siloxane system OE 6636 (Dow Corning Corp., USA) with a refractive index of 1.54 according to Table 4 was combined and homogenized with the H-siloxane-M5.

TABLE 4

Test specimens of OE 6636, covalently modified with M5

| No. | OE 6636 A | OE 6636 B | H-siloxane-M5 | M5 concentration in the matrix |
|---|---|---|---|---|
| 6 | 1 g | 1.88 g | 0.12 g | 40 ppm |
| 7 | 1 g | 1.76 g | 0.24 g | 80 ppm |
| 8 | 1 g | 1.64 g | 0.36 g | 120 ppm |

Then the mixture was deaerated in the vacuum drying chamber and cured between two polycarbonate plates with spacers of 1 mm for 2 h at 120° C. to obtain a transparent, yellow-fluorescing plate with a geometry of 40 mm×40 mm×1 mm. The test specimens obtained in this way were excited with monochromatic light of wavelengths of 440 nm to 540 nm in the fluorescence spectrometer and the respective response to this was recorded as the fluorescence emission spectrum. The fluorescence spectra of samples 6 to 8 are presented in FIG. 11, FIG. 12 and FIG. 13.

From the fluorescence spectra, it follows that the high-refractive-index siloxane system OE 6636 modified covalently with M5 absorbs and emits in a wavelength similar to that of the low-refractive-index siloxane system MED 6210 modified with M5. The absorption range lies between 440 nm and 540 nm, and the emission range, in contrast, between 520 nm and 650 nm.

Surprisingly, the combination of the H-siloxane modified covalently with M5, which is predominantly a polydimethylsiloxane, and the system OE 6636, which is predominantly a polydiphenylsiloxane, did not exhibit any cloudiness or precipitates.

Example 9

Synthesis of the Naphthalimide Dye F6

0.501 g 4-Bromo-1,8-naphthalimide (Sigma-Aldrich) was dissolved in toluene in a single-necked flask. For this purpose, a solution of 0.200 g allylamine hydrochloride in 0.61 mL triethylamine and 1 mL THF:ethanol (1:1) was added. This mixture was heated for 16 hours at 85° C. with stirring. The now yellowish solution was evaporated to dryness and the residue was purified by column chromatography on silica gel 60. The product was eluted with a 10:1 mixture of dichloromethane and ethyl acetate. After the removal of the solvent, a white solid F6a was obtained in a yield of 75% (0.428 g).

0.400 g (1.26 mmol) of the white solid F6a was dissolved in 30 mL DMF then 0.500 g phenol and 0.694 g (5.02 mmol) potassium carbonate were added. The mixture was heated to 145° C. and stirred for 1.5 hours at this temperature. After the cooling to room temperature, the solvent was removed on the rotary evaporator and the brownish residue was taken up in 100 mL chloroform. The organic phase was washed with 50 mL each of 5% sodium hydroxide solution (2 times), water (2 times) and saturated sodium chloride solution (1 time) and dried over MgSO$_4$. The yellow residue was chromatographed on silica gel 60. It was possible to elute the product with an 8:1 mixture of dichloromethane and ethyl acetate. After removal of the solvent mixture, it was possible to obtain 94% (0.392 g) F6. The quantum yield of F6 ($10^{-5}$ M) in Momentive RTV 655 was $\lambda_{ex}$ (371)=0.75.

The hydrosilylation reaction of the dye F6 was carried out in the presence of a Karstedt's platinum catalyst (platinum divinyltetramethyldisiloxane) with the H-siloxane model compound 1,1,3,3-tetramethyldisilane according to the following scheme.

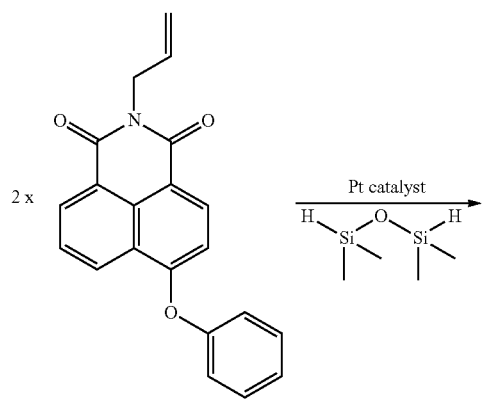

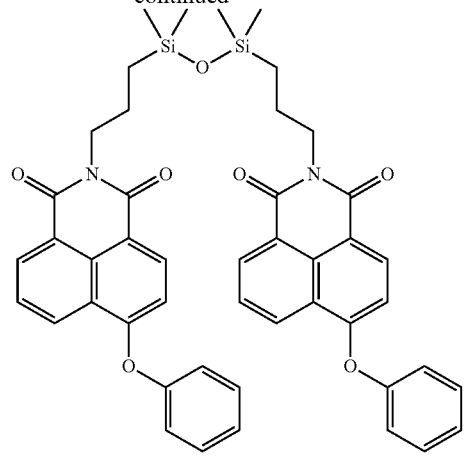

The progress of the reaction was additionally checked by $^1$H-NMR measurements. For this purpose, samples of the reaction solution were withdrawn at the beginning of the reaction and 24 hours after the beginning of the reaction, the solvent was evaporated and the samples were dissolved in CDCl$_3$.

The resonances of the dye F6 before (FIG. 14) and after (FIG. 15) the silylation reaction are illustrated in the segment of the $^1$H-NMR spectrum. The disappearance of the allyl resonances and the appearance of new resonances in the aliphatic region (e.g. at 4.16 ppm) prove the covalent binding of the dye F6 to the H-siloxane.

Example 10

Determination of Mechanical Properties

For the production of test specimens, the addition-cross-linking 2-component silicone Lumisil LR 7600 (Wacker Chemie AG, Germany) with the refractive index of 1.41 according to Table 5 was weighed in and homogenized.

TABLE 5

Test specimens of Lumisil LR 7600, unmodified and covalently modified with F4 and M5

| No. | LR 7600 A | LR 7600 B | H-siloxane-F4 | H-siloxane-M5 |
|---|---|---|---|---|
| 9 | 25 g | 24.224 g | — | 0.775 g (50 ppm) |
| 10 | 25 g | 24.687 g | 0.313 g (20 ppm) | — |
| 11 | 25 g | 25.000 g | — | — |

Then the mixtures were deaerated in the vacuum drying chamber and cured in polycarbonate molds for 2 h at 120° C. to obtain transparent plates (2 pieces per dye variant) with the geometry of 100 mm×100 mm×2 mm. From the plates, respectively 10 type 5A dumbbell specimens according to DIN EN ISO 527-2 were punched out and tested in the tension test according to DIN 53505 at a crosshead speed of 250 mm/min under normal climate conditions (23° C., 50% RH). From the tension-elongation curves obtained, tensile strength and elongation at break were determined.

The second plate was artificially aged in accordance with IEC 62067. The aging of the plates consisted of 20 cycles, each comprising 2 h of heating from 25° C. to 95° C., 2 h of isothermal holding at 95° C. and then 8 h of cooling to 25° C. After the aging, the mechanical properties were determined once again and compared with those before the aging (Table 6). The commercial product Powersil 600 (Wacker Chemie AG, Germany), which is used in conventional high-voltage devices, was chosen as reference material. Powersil 600 is a filled and non-transparent siloxane elastomer.

of 100 mm×100 mm×2 mm (2 pieces per dye variant) was used for the determination of the loss factor and of the capacitance.

TABLE 6

Mechanical properties (tensile strength σ and elongation at break ε) before and after aging

| Condition | Sample 11 | | Sample 10 | | Sample 9 | | Powersil 600 | |
|---|---|---|---|---|---|---|---|---|
| | σ [MPa] | ε [%] | σ [MPa] | ε [%] | σ [MPa] | ε [%] | σ [MPa] | ε [%] |
| new | 5.6 | 432 | 4.6 | 488 | 4.0 | 467 | 6.6 | 447 |
| aged | 4.0 | 377 | 4.0 | 375 | 4.0 | 341 | 6.3 | 385 |

The comparison of the tensile strength of the fluorescent polysiloxanes (sample 9 and 10) with the unmodified polysiloxane Lumisil LR 7600 (sample 11) shows that the tensile strength in the new condition is lowered by approximately 18% and 30% respectively by the modification, but in contrast remains at the same level of approximately 4 MPa after the aging in all samples.

The comparison of the elongation at break shows that fluorescent samples have, before aging, an elongation after break higher by 8% to 13% in comparison with the unmodified sample. After aging, the elongation at break of the modified sample 10 is equal within the range of error and that of the sample 9 is slightly (10%) smaller than in the unmodified sample 11.

The comparison of the mechanical properties of the unmodified (sample 11) and of the modified LR 7600 (samples 9 and 10) with the mechanical properties of the conventional, non-transparent polysiloxane Powersil 600 shows surprisingly that the transparent polysiloxanes satisfy the mechanical requirements for high-voltage devices.

Example 11

Determination of Electrical Properties

For the production of test specimens, the addition-cross-linking 2-component silicone Lumisil LR 7600 (Wacker Chemie AG, Germany) with the refractive index of 1.41 according to Table 5 was weighed in and homogenized. Then the mixtures were deaerated in the vacuum drying chamber and cured in polycarbonate molds for 2 h at 120° C. to obtain transparent plates. A geometry of 100 mm×100 mm×0.5 mm (1 piece per dye variant) was used for the measurement of the breakdown strength, and the geometry of 100 mm×100 mm×2 mm (2 pieces per dye variant) was used for the determination of the loss factor and of the capacitance.

For the determination of the breakdown strength, the 0.5 mm thick test specimen was placed on a planar ground electrode and a ball-tip high-voltage electrode (20 mm dia.) was placed on top of the test specimen. Then the high voltage of 1 kV (a.c. voltage, 50 Hz) was applied for 1 minute in each case and raised in steps of 1 kV until breakdown. The measurements were repeated at 5 different positions of the test specimen and the mean value was evaluated.

The determination of the capacitance and of the loss factor was carried out on the 2-mm-thick test specimen in a test apparatus of type 2904 (Tettex Instruments, Basel, Switzerland) for solid insulating materials. The test specimens were placed between the planar electrodes of the apparatus then covered with a glass hood, and capacitance and loss factor were determined at room temperature (23° C.) and at elevated temperature (90° C.) at a voltage of 1.5 kV (a.c. voltage, 50 Hz). The test specimens for the determination of capacitance and loss factor were aged according to the method described in Example 10 and investigated once again after aging. The measured values before and after aging are presented in Table 7 and Table 8.

TABLE 7

Loss factor tan δ and capacitance C before and after aging

| | Sample 11 | | Sample 10 | | Sample 9 | | Powersil 600 | |
|---|---|---|---|---|---|---|---|---|
| Condition | tan δ [$10^{-4}$] | C [pF] | tan δ [$10^{-4}$] | C [pF] | tan δ [$10^{-4}$] | C [pF] | tan δ [$10^{-4}$] | C [pF] |
| New (23° C.) | 9.1 | 22.9 | 8.7 | 24.6 | 8.8 | 23.7 | 7.3 | 24.6 |
| New (90° C.) | 18.3 | 21.0 | 18.6 | 22.7 | 19.3 | 22.1 | 38.3 | 23.1 |
| Aged (23° C.) | 8.2 | 23.4 | 8.5 | 23.2 | 8.6 | 23.7 | 4.3 | 25.3 |
| Aged (90° C.) | 22.0 | 22.2 | 18.7 | 21.4 | 17.7 | 23.7 | 12.9 | 23.4 |

TABLE 8

Breakdown strength $E_b$

| | Breakdown strength $E_b$ [kV/mm] | | | |
|---|---|---|---|---|
| Condition | Sample 11 | Sample 10 | Sample 9 | Powersil 600 |
| New (23° C.) | 30.6 | 32.3 | 32.7 | 29.6 |

Unexpectedly, the transparent material LR7600 (sample 11) exhibits a breakdown strength as high as than of Powersil 600. This is not changed within the range of the measurement error by the modification with the fluorescent dyes according to the invention.

At 23° C., the loss factor of the unmodified polysiloxane lies at 9.1×$10^{-4}$, and it is practically not changed by the modification with the fluorescent dyes. For all Lumisil-LR- 7600 samples 9, 10 and 11, the values of the loss factor at 90° C. exhibit practically no change before and after aging. This behavior shows that Lumisil LR 7600 is stable to aging and this stability is surprisingly not influenced by the modification with the fluorescent dyes according to the invention and thereby it is particularly suitable as material for high-voltage devices.

The capacitance of all samples reveals no influence of the type of the material, of the modification or of the aging, and always lies in the range of 21 pF to 24 pF.

The comparison of the electrical properties of the unmodified (sample 11) and of the modified LR 7600 (samples 9 and 10) with the electrical properties of the conventional, non-transparent polysiloxane Powersil 600 shows unexpectedly that the transparent polysiloxanes satisfy the electrical requirements for high-voltage devices.

In the combination of their optical, electrical and mechanical properties, new areas of application are therefore opened up unexpectedly for the fluorescent polysiloxanes according to the invention and, in fact, areas of application for which an urgent need exists that heretofore it has not been possible to address satisfactorily.

Polysiloxanes with covalently bound fluorescent dyes as material for optical waveguides and for high-voltage accessories are not known from the prior art. It is also not obvious for the person skilled in the art to use them for this purpose, because organic dyes in insulations of high-voltage accessories have heretofore been regarded as contamination for the person skilled in the art and may represent nuclei for the tree growth, which ultimately may end in a breakdown.

Surprisingly, the measurements of the breakdown behavior on the polysiloxanes modified covalently with fluorescent dyes did not indicate any reduction of the breakdown strength of this material.

As a further surprisingly positive optical effect, it turns out that the polysiloxanes according to the invention exhibit a shift of the emission range from the UV light or expansion thereof into the range of the visible light with wavelengths up to 800 nm, so that they are particularly suitable for detectors whose highest efficiency lies in this range and furthermore they permit more cost-effective manufacture thereof.

Contrary to the phenomenon known to the person skilled in the art, that quenching effects can usually be observed in the case of mixing of dyes, the method according to the invention leads to fluorescent polysiloxanes with the surprisingly positive effect of enhancement of their absorption and emission properties.

Furthermore, for the new polysiloxanes, their high electrical breakdown strength in a voltage range up to 500 kV has proved to be a likewise unexpected effect. This breakdown strength finds its explanation especially in the step, essential to the invention, of the method that for the synthesis of the polysiloxanes, i.e. the removal of the platinum catalyst by means of a sorbent.

With the said optical and electrical properties as well as the likewise positive effects of a temperature resistance up to 150° C. and the high elongation to break of up to 400%, the polysiloxanes according to the invention differ substantially in their properties from polysiloxanes according to the prior art, and to this extent represents the basis for a material that meets the high requirements for high-voltage devices.

With the shift away from nuclear and fossil energy sources, the transition to renewable energies and the associated erection of offshore wind turbines, substantially stricter requirements are being imposed, for example, on cable junction boxes, with which marine cables and also cables laid underground for transmission of the energy at extra-high-voltage levels must be equipped. A reliable monitoring is indispensable for such cable junction boxes, in order to be able to detect and locate, in timely manner, risks in the process of aging of materials, as well as defects. With the polysiloxanes according to the invention and their excellent properties, this technical problem that urgently must be solved will be addressed in an economically advantageous manner.

The invention claimed is:

1. A fluorescent siloxane elastomer that contains, in its network structure, the following structural elements:

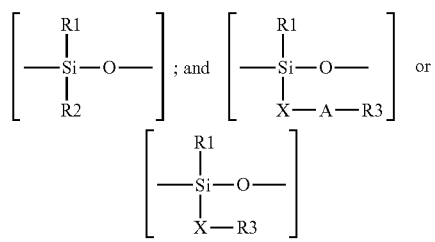

where:
R1 and R2 are identical or different, and independently of one another respectively denote a methyl, phenyl, vinyl substituent or an H atom;
X denotes a saturated or unsaturated hydrocarbon group with 2 to 6 C atoms;
A represents an oxygen atom, or a sulfur atom;
R3 is a fluorescent dye substituent from BODIPY fluorophores.

2. The fluorescent siloxane elastomer according to claim 1, wherein the fluorescent-dye substituent R3 has the general formula

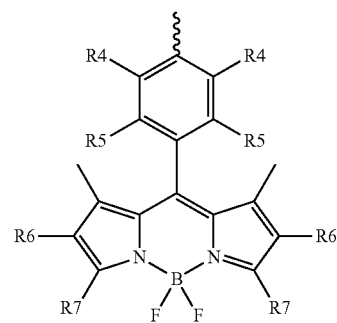

in which:
R4, R5 may be identical or different and denote a hydrogen atom, a fluorine atom or a trifluoromethyl radical,
R6 represents a $CH_3$ or $C_2H_5$ group;
R7 denotes a $CH_3$, $C_2H_5$, 4-dimethylaminostyryl, 3,5-ditrifluoromethylstyryl or 4-dimethylaminonaphthylvinyl radical.

3. The fluorescent siloxane elastomer according to claim 1, wherein the BODIPY fluorophores together with coumarin fluorophores form the fluorescent dye substituents.

4. The fluorescent siloxane elastomer according to claim 3, wherein the coumarin fluorphores have the general formula

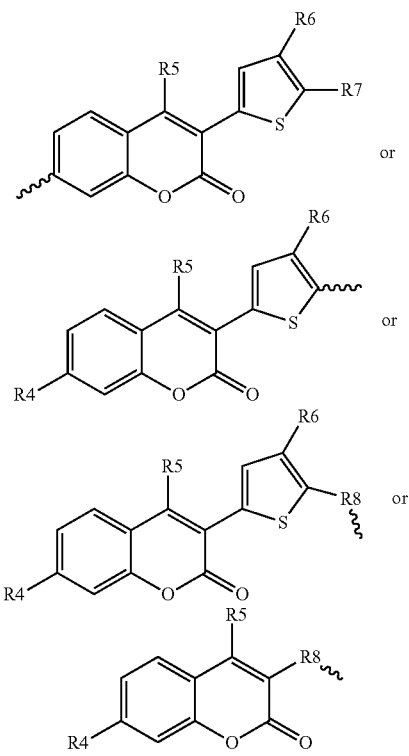

in which:
- R4 denotes an H atom or an OCH₃, NHCH₃, N(CH₃)₂, NH(C₂H₅) or N(C₂H₅)₂ radical;
- R5 is an H atom or F atom or a CH₃, CF₃ radical;
- R6, R7 may be identical or different and represent an H atom or a CH₃ radical,
- R8 represents a COO, CONH, CON(CH₂—CH=CH₂) or SO₂NH, SO₂N(CH₂—CH=CH₂) group.

5. The fluorescent siloxane elastomer according to claim 1, wherein the BODIPY fluorophores together with naphthalimide fluorophores form the fluorescent dye substituents.

6. The fluorescent siloxane elastomer according to claim 5, wherein the naphthalimide fluorophores have the general formula

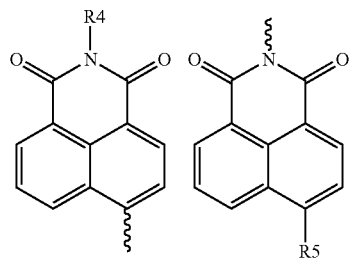

in which:
- R4 denotes a CH₃, C₂H₅, C₃H₇, phenyl, mesityl or a (2,6-diisopropyl)phenyl group;
- R5 represents an H atom or a CH₃, OCH₃, or O(C₆H₅) radical.

7. The fluorescent siloxane elastomer according to claim 1, wherein the refractive index lies in the range of 1.40 to 1.60 and/or in that after the curing it is a transparent or translucent elastomer.

8. The fluorescent siloxane elastomer according to claim 1, wherein it has absorption and emission maxima in the wavelength range of 300 nm to 800 nm.

9. The fluorescent siloxane elastomer according to claim 1, wherein the fluorescent siloxane elastomer is temperature-resistant up to 150° C. and/or is aging-resistant in the electrical field of a high-voltage device for voltages from 1 kV to 500 kV.

10. The fluorescent siloxane elastomer according to claim 1, wherein the fluorescent siloxane elastomer has a dye concentration of 5 ppm to 500 ppm.

11. The fluorescent siloxane elastomer according to claim 1, wherein the fluorescent siloxane elastomer contains a filler.

12. The fluorescent siloxane elastomer according to claim 11, wherein the filler is fumed silica or titanium dioxide or aluminum oxide or zirconium oxide.

13. The fluorescent siloxane elastomer according to claim 1, wherein it has an elongation to break of up to 400%.

14. A method for synthesis of a fluorescent siloxane elastomer according to claim 1, comprising:
- Functionalization of the fluorescent dye with an unsaturated hydrocarbon group for a hydrosilylation reaction in a polar solvent at elevated temperature and under a nitrogen atmosphere at normal pressure or an elevated pressure,
- Reaction of the functionalized dye with an H-siloxane in a nonpolar solvent in the presence of platinum or rhodium as the hydrosilylation catalyst at room temperature or an elevated temperature,
- Removal of the catalyst by means of a sorbent and of the solvent under reduced pressure,
- Mixing of an addition-crosslinking, two-component siloxane mixture with the functionalized H-siloxane at room temperature,
- Curing of the siloxane mixture at an application-specific temperature of up to 200° C.

15. The method according to claim 14, wherein the polar solvent is acetonitrile or an alcohol and the nonpolar solvent is toluene or another aromatic hydrocarbon, an aliphatic or a chlorinated hydrocarbon, a cyclic ether or a vinylsiloxane.

16. The method according to claim 14, wherein the sorbent is a copolymer of divinylbenzene and vinylimidazole.

* * * * *